United States Patent [19]

Spoetzl

[11] Patent Number: 4,923,385
[45] Date of Patent: May 8, 1990

[54] BLOW MOLDING MACHINE

[75] Inventor: Markus Spoetzl, Munich, Fed. Rep. of Germany

[73] Assignee: Krauss-Maffei A.G., Fed. Rep. of Germany

[21] Appl. No.: 333,011

[22] Filed: Apr. 4, 1989

Related U.S. Application Data

[62] Division of Ser. No. 68,331, Jul. 1, 1987, Pat. No. 4,871,492.

[30] Foreign Application Priority Data

Jul. 9, 1986 [DE] Fed. Rep. of Germany ....... 3623099

[51] Int. Cl.$^5$ .............................................. B29C 49/42
[52] U.S. Cl. .................... 425/522; 264/536; 425/527
[58] Field of Search ......................... 425/522, 525–528, 425/531, 535, 536, 532; 264/39, 238, 349, 533, 536, 540

[56] References Cited

U.S. PATENT DOCUMENTS

| | | | |
|---|---|---|---|
| 3,503,099 | 3/1970 | Uhlig | 425/535 X |
| 3,907,475 | 9/1975 | Bowers | 425/526 |
| 4,147,748 | 4/1979 | Saumsiegle | 425/528 X |
| 4,285,657 | 8/1981 | Ryder | 425/535 X |
| 4,403,940 | 9/1983 | Krishnamumar et al. | 425/535 X |
| 4,484,884 | 11/1984 | Wiatt et al. | 425/535 X |
| 4,552,527 | 11/1985 | Hunter | 425/535 |

FOREIGN PATENT DOCUMENTS 8201332 5/1982 Fed. Rep. of Germany .

OTHER PUBLICATIONS

"Das Blaswerkzeug"; VDI-Verlag (Press); 1984; pp. 77–78.

Primary Examiner—Richard L. Chiesa
Attorney, Agent, or Firm—Robert J. Koch

[57] ABSTRACT

On the sizing unit of a blow molding machine, one or more blow mandrels are mounted in blow mandrel holders and are centered in sizing plate openings. To obtain faster and more accurate centering, the blow mandrel holder has independently adjustable sleeve and flange parts. The sleeve adjusts axial location while the flange fixes radial location. Conical mandrel tips and sizing plate openings facilitate rapid alignment as the blow mandrels are lowered.

32 Claims, 3 Drawing Sheets

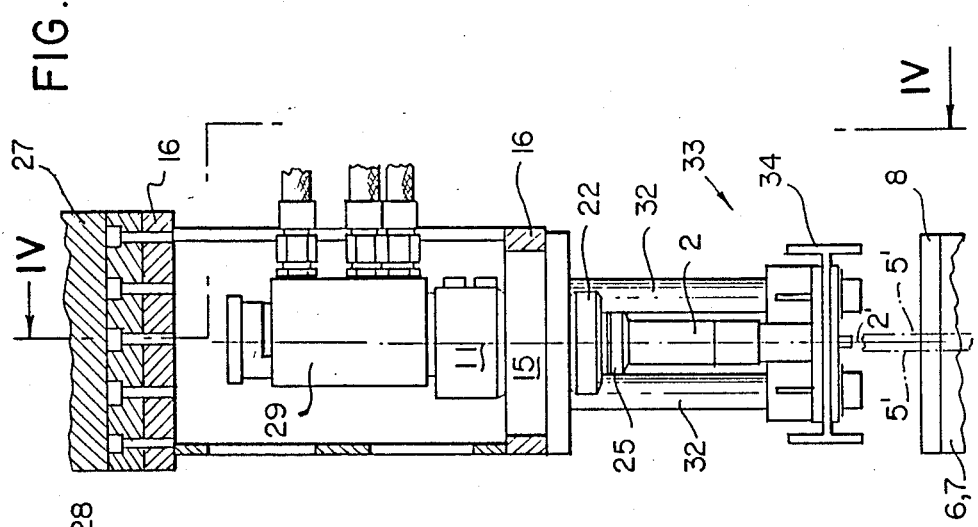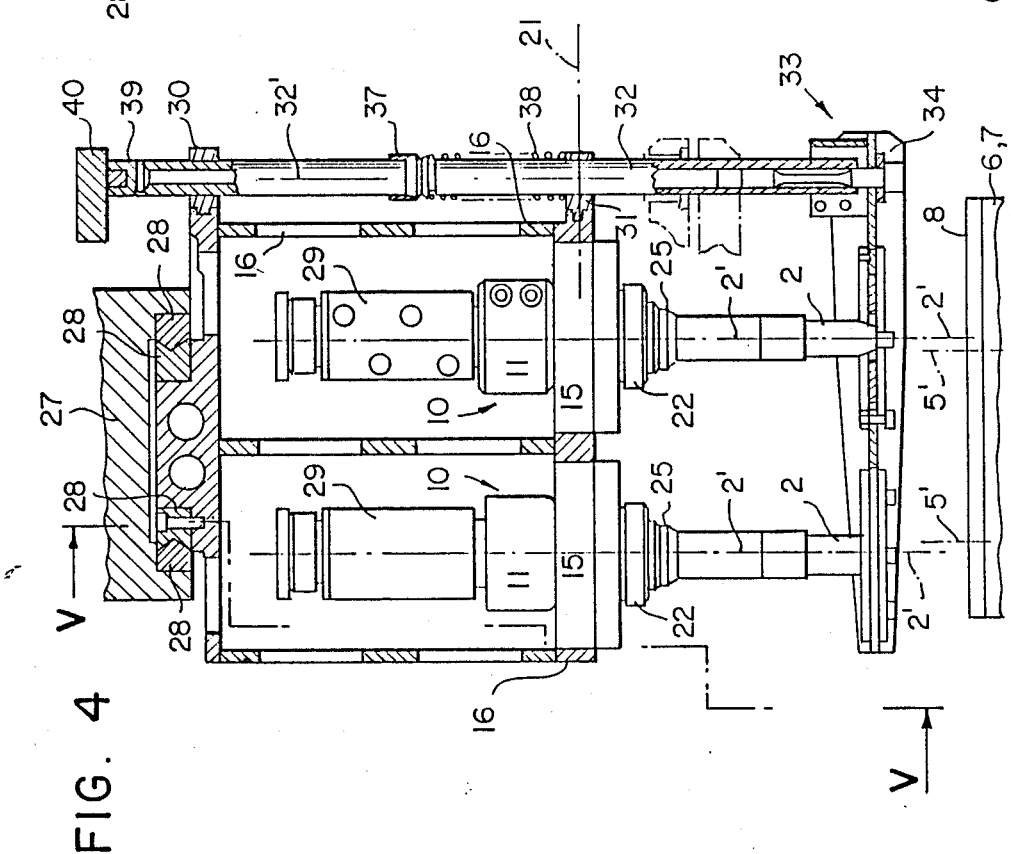

BLOW MOLDING MACHINE

This application is a divisional of application Ser. No. 068,331, filed July 1, 1987, now U.S. Pat. No. 4,871,492, the disclosure of which is incorporated herein.

BACKGROUND OF THE INVENTION

The invention relates to a blow molding machine readily adjustable for a variety of molds.

At the sizing station of a blow molding machine, the blow mandrel has a cutting sleeve and rises and descends for sizing. Precise placement is needed so that upon its descent into the sizing plate opening, the sleeve smoothly cuts a uniform wall thickness in the parison neck. These requirements must be satisfied if several blow mandrels are arranged on one sizing unit which must be lowered into several sizing plate openings. Both in the case of single blow mandrel and with several blow mandrels on one sizing unit, time consuming adjusting work is required to match the mandrel to the appropriate opening.

DESCRIPTION OF RELATED TECHNOLOGY

The literature, "Das Blaswerkzeug", VDI-Verlag (Press) 1984, pages 77 and 78, carries out the fine adjustments for one or several blow mandrels transversely to and along the tool parting plane by using rapid action toggle clamps. Scales and indicators are used in both directions so that the settings may be carried out in a reproducible manner. This type of calibration method is very time consuming.

The adjustment process necessitates frequent checking and adjusting. Also, no precise coordinates can be obtained using scales and indicators. The scales permit only relatively coarse settings, and the blow machine and the mobile sizing station elements may experience deviations from the overall setting during operation.

SUMMARY OF THE INVENTION

It is an object of the invention to develop a blow molding machine having more accurate mandrel settings and obtained with shorter calibration times.

This objective is achieved by using a blow machine with a sizing unit which comprises at least one blow mandrel having a cutting sleeve, and a blow mandrel holder comprising a sleeve part and a flange part whereby the sleeve adjustably secures the holder from axial movement and the flange adjustably secures the holder from radial movement.

Using a blow mandrel holder as a sleeve with an integrally attached flange, the setup operation may be carried out essentially automatically. Mandrels and loosened holders are lowered onto the sizing plates. The mandrel height adjustment is obtained by the cutting edges of the cutting sleeves coming to rest in the sizing plate openings. The transverse mandrel setting in the setting plane is attained by tapered blow mandrels aligning with the openings of the sizing plates. The settings thus take place automatically both in height and in the transverse direction, whereupon one merely secures the holder for the mandrel.

In a convenient embodiment, part of the sleeve is in the form of a guide and another part constitutes a clamping sleeve. The blow mandrel is guided precisely in the axial direction and may be secured in proper position by the clamping sleeve.

Preferably, the blow mandrel holder is fastened in the setting plane on the blow mandrel holder by a clamping ring. The ring is preferably loaded by an axially acting compression spring, thus forcing the flange to remain exactly in the setting plane. This spring also assures that no tilting can occur during the automatic setting of the blow mandrel.

To improve the setting of the blow mandrel in the axial direction, a stop ring may be provided. This allows the blow mandrel cutting sleeve edge to be pressed securely into the opening of the sizing plate to the limits of the stop ring. This helps to achieve a particularly precise automatic adjustment of one or more blow mandrels in a carrier.

BRIEF DESCRIPTION OF THE DRAWINGS

One form of embodiment of the invention is explained below in more detail with reference to the drawing, wherein:

FIG. 4 is a section through a sizing unit carrying two blow mandrels on the line IV—IV in FIG. 5;

FIG. 5 is a sectional view through the sizing unit according to section line V—V in FIG. 4.

DESCRIPTION OF THE PREFERRED EMBODIMENT

Figure 1:
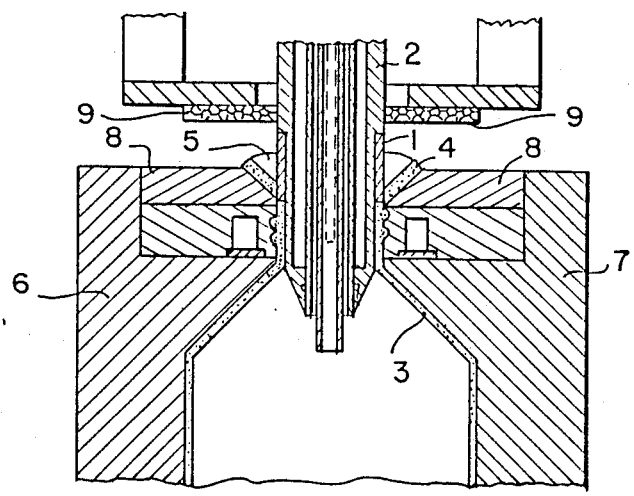
FIG. 1 shows an axial section through the tip of a blow mandrel equipped with a cutting sleeve in the sizing position and within the opening of a sizing plate.

FIG. 1 shows the tip of a blow mandrel 2 equipped with a cutting sleeve 1 and located in the sizing position within the neck opening of a bottle 3. The neck roundel 4 of bottle neck 3 is cut by cutting sleeve 1 having an edge resting against the conical wall of opening 5 formed in the sizing plate 8. Plate 8 is fastened to tool halves 6 and 7. The blow mandrel 2 passes through a stripper plate 9 whereby the neck roundel 4 is stripped while raising the blow mandrel from the bottle neck 3 and opening 5.

Figure 2:
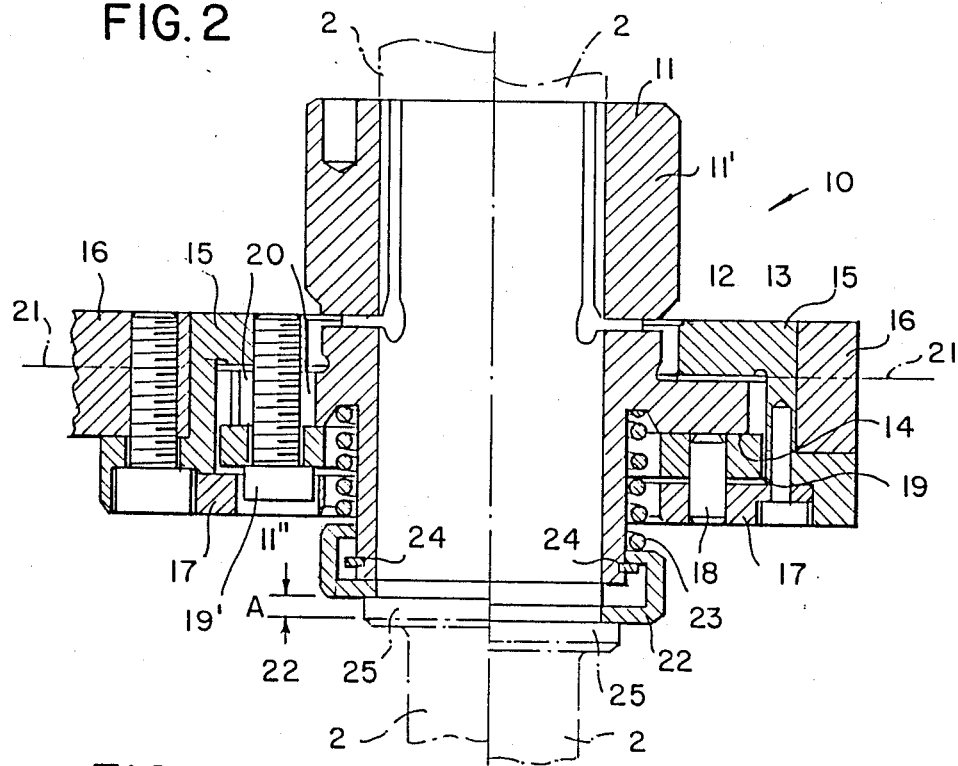
FIG. 2 is an axial section showing two positions of an embodiment of a blow mandrel holder according to an embodiment of the invention.

FIG. 2 shows a blow mandrel holder 10 as an integral combination of sleeve part 11 and flange part 12. Sleeve 11 is designed as a clamping sleeve 11' and as a guide sleeve 11''. Flange 12 comprises an upper annular disk surface 13 and a lower annular disk surface 14. With its upper annular surface 13, flange 12 abuts against a modular ring 15. A gasket for increasing friction between surface 13 and ring 15 may be inserted. Modular ring 15 is fastened in blow mandrel carrier 16.

A retainer ring 17 is mounted in modular ring 15 with a plurality of guide pins 18. Pins 18 are securely anchored in retainer ring 17. Pins 18 also pass through a clamping ring 19 such that clamping ring 19 is freely displaceable in the axial direction and fixedly connected to retainer ring 17 for rotation.

Clamping ring 19 is pressed by screws 19' against the lower annular disk surface 14. Screws 19' are screwed into modular ring 15 and pass through flange 12 in openings 20. In loosened state, screws 19' make radial displacement of flange part 12 in setting plane 21 possible.

A stop ring 22 is provided on the lower end of sleeve part 11 and is exposed to the action of an axial spring 23 supported in sleeve part 11. Stop ring 22 may be displaced over an axial tolerance distance A. The axial motion is limited by the abutment of stop ring 22 against the lower edge of the sleeve and by a stop 24 located in sleeve part 11.

In the left half of FIG. 2, blow mandrel 2 is shown by dash-and-dot lines with stop ring 22 (resting on the annular shoulder 25 of the blow mandrel 2) abutting against the lower edge of sleeve part 11.

In the right half of FIG. 2, stop ring 22 is resting on stop 24. Note the axial displacement distance A between the bottom of flange part 12 and blow mandrel 2.

Figure 3:
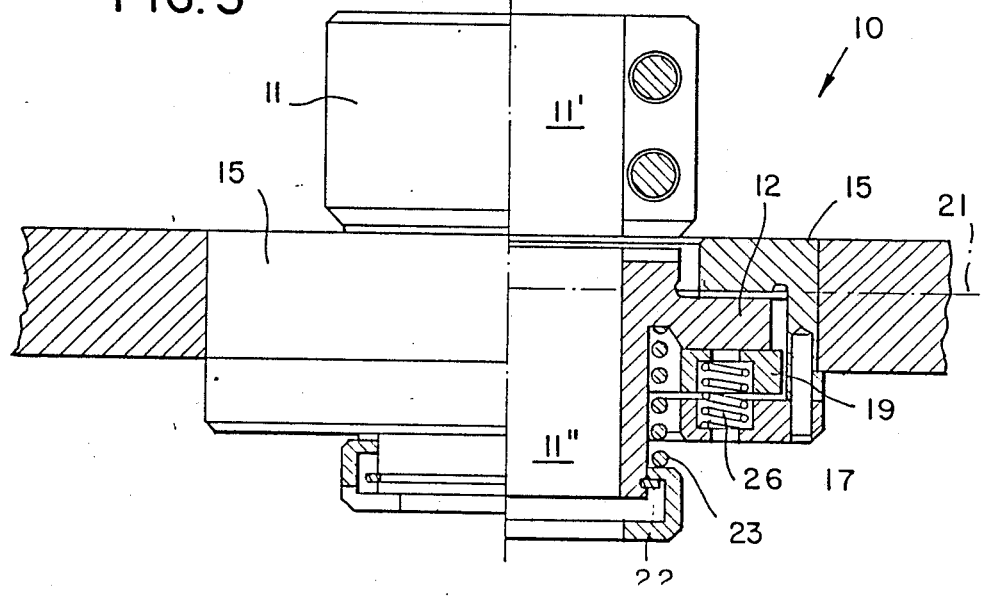
FIG. 3 is a semi-section through the blow mandrel holder shown in FIG. 2, but in a different cutting angle representing the layout of a compression spring.

FIG. 3 shows the blow mandrel holder 10 from FIG. 2 in a cutting angle offset relative to the view of FIG. 2, but with a compression spring 27 in lieu of guide pin 18. Spring 26 is supported at one end in the retainer ring 17 and abuts its other end against clamping ring 19. If the screws 19' are loose, clamping ring 19 is pushed against flange 12 with a compressive force which permits a slight radial mobility in blow mandrel holder 10 in setting plane 21 and relative to the blow mandrel carrier and modular ring 15. The pressure and positioning of spring 26 insure that blow mandrel holder 10 does not tilt during the automatic centering of mandrel 2 on opening 5 in sizing plate 8 (FIG. 1).

FIGS. 4 and 5 show a sizing unit 27 carrying two blow mandrels 2. Blow mandrel carrier 16 is shown as a blow mandrel cassette which replaceably fastens to the vertically moving sizing unit 7 using a dovetail guide 28. Blow mandrels 2 are held in blow mandrel holders 10 and are replaceably fastened to blow mandrel carrier 16 or the blow mandrel cassette by modular ring 15.

Protruding from blow mandrel holder 10 is connecting head 29 which connects With compressed air and cooling water lines (not shown).

Holding rods 32 of stripper plate holder 34 are supported in an axially displaceable manner by upper and lower bearings 30 and 31, respectively. These bearings are sufficient for bearing the attachment load due to the weight and movement forces associated with blow mandrel carrier 16. Holding rods 32 carry stripper plates 33 in holder 34 (note stripper plate 9 of FIG. 1) in the form of an annular disk 25. Rods 32 guide plate 33 in a plane perpendicular to the blow mandrel axis 2' but permit free movement in holder 34.

Figure 6:
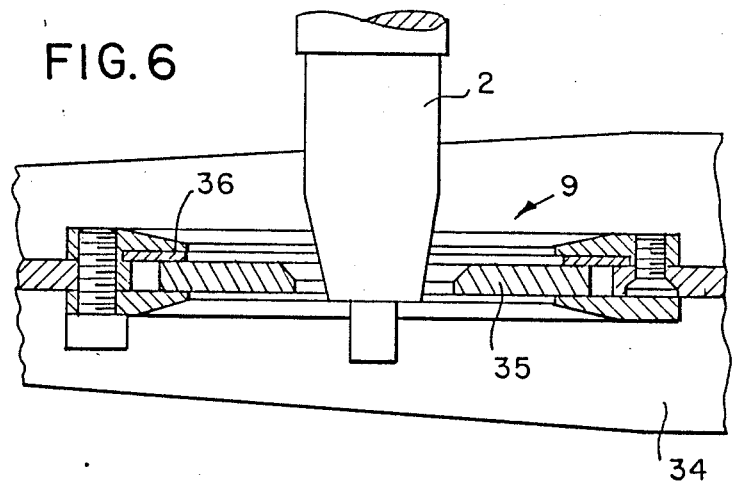
FIG. 6 is a detail view of the stripper blade according to FIGS. 4 and 5.

As seen in the more detailed view of FIG. 6, annular disk 35 is pressured against holder 34 by a plate spring 36. Annular disk 35 thus occupies an annular position after the initial centering penetration of the blow mandrel tip and during subsequent working steps.

Returning to FIGS. 4 and 5, stop ring 37 is mounted on each of the holding rods 32 between bearings 30 and 31. Compression spring 38 is between lower bearing 31 and stop rings 37 so that holding rods 32 are pressed upward relative to blow mandrel carrier 16 until the ends 39 of holding rods 32. rest against stop points 40 fixedly mounted on the machine frame.

Sizing plates 8 on tool halves 6 and 7 are arranged below blow mandrel 2. Opening axes 5' in sizing plates 8 are shown out of alignment with mandrel axes 2'. This positioning represents the unadjusted starting situation for a blow molding process.

To properly center the mandrels 2 on openings 5 in a radial plane 21 perpendicular to mandrel axes 2', screws 19' are first loosened. Mandrel holder 10 freely displaces radially in ring 15 yet flange 12 remains properly in plane 21. Sizing unit 27 is lowered so that mandrels 2 enter openings 5 in the sizing plate 8. Although blow mandrels 2 are offset relative to opening axes 5', the conical configurations of the blow mandrel tips and the openings 5 automatically center the blow mandrel holders 10. Holders 10 radially displace modular ring 15 while remaining in setting plane 21 until the mandrel axes 2' are exactly aligned with the opening axes 5'. Tightening screws 19 secures blow mandrels 2 in this radially centered position.

When openings 5 are at different levels, blow mandrels 2 must be axially adjusted. Clamping sleeve 11' is loosened so that blow mandrel 2 is freely displaceable as guided by sleeve 11'. Upon the lowering of the sizing unit 27, the first blow mandrel 2 comes to rest on the highest opening 5. The blow mandrel 2 will rest its annular shoulder 25 on stop ring 22 as shown in the right half of FIG. 2. As sizing unit 27 continues to lower, blow mandrel 2 is displaced by tolerance distance A against axial spring 23 until stop ring 22 rests against the lower edge of sleeve part 11 (left half of FIG. 2). In this position, blow mandrel 2 is axially secured by tightening clamping sleeve part 11'. The tolerance distance A is dimensioned so that it is wider than the greatest level difference among openings 5 in sizing plates 8. In this way, after the first stop ring 22 touches the lower end of sleeve part 11, the other blow mandrels 2 are in position and may be secured by their respective clamping sleeves 11'.

According to the scope of the invention, at least the following modifications are foreseen:

modifying the blow mandrels 2 within sleeve parts 11;

modifying the blow mandrels 2, mandrel holders 10, and modular rings 15; and modifying the blow mandrels 2 and blow mandrel cassettes.

The blow mandrel cassettes may carry one or several blow mandrels. The blow mandrel cassettes may be of different types or numbers and mounted on dovetail guide 28 of sizing unit 27.

I claim:

1. A sizing unit useful for a blow molding apparatus comprising:
    at least one blow mandrel; and
    at least one blow mandrel holder comprising:
    a sleeve connected to said mandrel by an adjustable means for fixing an axial alignment of said mandrel;
    a flange connected to said mandrel by adjustable means for fixing radial alignment of said mandrel; and
    a blow mandrel carrier attached to said sizing unit and detachably connected to said at least one blow mandrel holder.

2. A blow molding sizing unit according to claim 1 wherein said sleeve is a different physical piece from said flange.

3. A blow molding sizing unit according to claim 1 wherein said sleeve and said flange are an integral piece.

4. A blow molding sizing unit according to claim 1 wherein said flange is at least partially disposed between
    (a) a modular ring, and
    (b) a clamping ring.

5. A blow molding sizing unit according to claim 4 further comprising a retainer ring which supports said clamping ring and is fixedly connected to said blow mandrel carrier.

6. A blow molding sizing unit according to claim 4 further comprising means for adjustably restraining radial motion of said flange between said modular ring and said clamping ring.

7. A blow molding sizing unit according to claim 6 wherein said means for adjustably restraining radial motion further comprises means for restraining axial motion when radial motion is restrained.

8. A blow molding sizing unit according to claim 1 further comprising a stop ring movably connected to said sleeve.

9. A blow molding sizing unit according to claim 8 further comprising a means for maintaining axial pressure on said stop ring.

10. A blow molding sizing unit according to claim 9 wherein said means for maintaining axial pressure comprises a spring.

11. A blow molding sizing unit according to claim 1 wherein said blow mandrel carrier is in a modular construction.

12. A blow molding sizing unit according to claim 11 wherein at least one blow mandrel carrier module is attached to said sizing unit by dovetail guides on said carrier.

13. A blow molding sizing unit according to claim 11 wherein at least one blow mandrel carrier module is attached to said sizing unit by dovetail guides on said sizing unit.

14. A blow molding sizing unit according to claim 11 wherein at least two of said carrier modules are detachably connected so as to form a mandrel cassette.

15. A blow molding sizing unit according to claim 14 further comprising dovetail guides attached to said cassette for attachment to said sizing unit.

16. A blow molding sizing unit according to claim 1 wherein said blow mandrel carrier further comprises annular stripping means for stripping residual material from said blow mandrel.

17. A blow molding sizing unit according to claim 16 wherein said annular stripping means comprises a stripper plate attached to said blow mandrel carrier.

18. A blow molding sizing unit according to claim 17 wherein said stripper plate comprises a hole through which said blow mandrel passes.

19. A blow molding sizing unit according to claim 1 wherein said blow mandrel comprises a cutting sleeve attached to said mandrel.

20. A blow molding sizing unit according to claim 1 wherein said blow mandrel comprises a conically shaped tip.

21. A blow molding machine with a sizing unit comprising at least one blow mandrel equipped with a cutting sleeve and having a longitudinal axis wherein each mandrel is mounted in a blow mandrel holder adjustably fastened to a blow mandrel carrier located on said sizing unit and in a setting plane perpendicular to said longitudinal axis of said blow mandrel, wherein said blow mandrel holder comprises:

an adjustable sleeve part securing axial alignment of said blow mandrel and an adjustable flange part securing radial alignment of said blow mandrel.

22. A blow molding machine according to claim 21, wherein said sleeve part comprises a clamping sleeve.

23. A blow molding machine according to claim 21, wherein said flange part is resting with an upper annular disk surface directly against said blow mandrel carrier and is exposed with a lower annular disk surface to a clamping ring which is supported in a retainer ring surrounding said flange part and is fixedly connected with said blow mandrel carrier such that said clamping ring is held by guide pins fastened in said retainer ring and passing through said clamping ring and is freely displaceable axially and fixedly held in rotation, wherein said flange part is fastened to said blow mandrel carrier by said clamping ring and screws passing through said flange part.

24. A blow molding machine according to claim 23, further comprising a compression spring between said clamping ring and said retainer ring.

25. A blow molding machine according to claim 23, wherein said sleeve part has a lower end comprising a stop ring resting on an annular shoulder of said mandrel, said stop ring being held by an axial spring and supported in said sleeve part at an axial tolerance distance from said lower end by an axial stop and by said sleeve.

26. A blow molding machine according to claim 25, wherein said flange part is fastened on said blow mandrel carrier by a modular ring carrying said clamping ring and said retainer ring; and said blow mandrel carrier, said modular ring, said retainer ring and said clamping ring, associated screws, pins, and compression springs constitute a blow mandrel holder module fastened as a replaceable unit in said blow mandrel carrier.

27. A blow molding machine according to claim 26, wherein in that said blow mandrel carrier is constructed as a blow mandrel cassette, which cassette is in a form for mounting individually or in combination with several blow mandrel cassettes on said sizing unit.

28. A blow molding machine according to claim 27, wherein said blow mandrel cassette comprises at least one blow mandrel mounted in blow mandrel modules.

29. A blow molding machine according to claim 28, wherein at least one blow mandrel cassette is fastened to said sizing unit by dovetail guides.

30. A blow molding machine according to claim 28, further comprising a stripper plate holder is mounted on said blow mandrel cassette which carries a stripper plate comprising an annular disk which in its disk plane in said stripper plate holder is freely displaceable within a tolerance circle.

31. A blow molding machine according to claim 30, wherein said annular disk is pressured by a plate disk against said stripper plate holder.

32. A blow molding machine according to claim 31, including a sizing unit comprising at least one blow mandrel equipped with cutting sleeves may be displaced relative to one or several sizing plates wherein a blow mandrel is always mounted in a blow mandrel holder, displaceably fastened in a setting plane perpendicular to the mandrel axis characterized in that a stripper plate holder is on said blow mandrel carrier and said stripper plate holder comprises:

two holding rods supported in axes parallel to said mandrel axis by upper and lower bearings in an axially displaceable manner;

at least one stripper plate formed of annular disks on one end;

a stop for impact on machine frame stop points on an opposite end; and a stationary stop ring between at least an upper and lower bearing wherein between said stop ring and said lower bearing is a compression spring so that said stripper plate is urged upward upon lowering said sizing unit onto said sizing plate until said stop ring contacts said upper bearing and a lowered position is attained, and upon raising said sizing unit, said stripper plate moves toward an end of said blow mandrel.

* * * * *